United States Patent
Danner et al.

(10) Patent No.: US 10,480,739 B2
(45) Date of Patent: Nov. 19, 2019

(54) HEADLAMP FOR VEHICLES HAVING AT LEAST ONE LASER LIGHT MODULE

(71) Applicant: ZKW GROUP GMBH, Wieselburg (AT)

(72) Inventors: Markus Danner, Ollersdorf (AT);
Michael Riesenhuber, Bergland (AT);
Bettina Reisinger, Amstetten (AT);
Peter Mayer, Neumarkt an der Ybbs (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days.

(21) Appl. No.: 15/780,475

(22) PCT Filed: Dec. 16, 2016

(86) PCT No.: PCT/AT2016/060131
§ 371 (c)(1),
(2) Date: May 31, 2018

(87) PCT Pub. No.: WO2017/106893
PCT Pub. Date: Jun. 29, 2017

(65) Prior Publication Data
US 2018/0347774 A1 Dec. 6, 2018

(30) Foreign Application Priority Data
Dec. 22, 2015 (AT) .............................. A 51094/2015

(51) Int. Cl.
*F21S 41/16* (2018.01)
*F21S 41/14* (2018.01)
(Continued)

(52) U.S. Cl.
CPC ............... *F21S 41/16* (2018.01); *F21S 41/14* (2018.01); *F21S 41/29* (2018.01); *F21S 45/70* (2018.01);
(Continued)

(58) Field of Classification Search
None
See application file for complete search history.

(56) References Cited

U.S. PATENT DOCUMENTS

2017/0122516 A1  5/2017  Hager et al.

FOREIGN PATENT DOCUMENTS

| DE | 102012220472 A1 | 5/2014 |
| DE | 102012220481 A1 | 5/2014 |

(Continued)

OTHER PUBLICATIONS

Search Report issued in Austrian Application No. A 51094/2015, completed Nov. 11, 2016 (1 page).
(Continued)

*Primary Examiner* — Vip Patel
(74) *Attorney, Agent, or Firm* — Eversheds Sutherland (US) LLP

(57) ABSTRACT

A headlamp (1) for vehicles having at least one laser light module (3l, 3m, 3r) which has a laser light source (11) and a phosphorus element (13) which is arranged downstream of the latter in the beam path and a front-end optical system (16) in which the at least one laser light module is arranged in a housing (2) of the headlamp which has a projection optical system (4) for projecting the light distribution generated in the focal plane of the projection optical system of the at least one laser light module into the carriageway space, and at least one deflection prism (20; 22, 23) is integrated into the at least one front-end optical system (16), which deflection prism (20; 22, 23) lies in the region of the
(Continued)

Figures 1, 2:
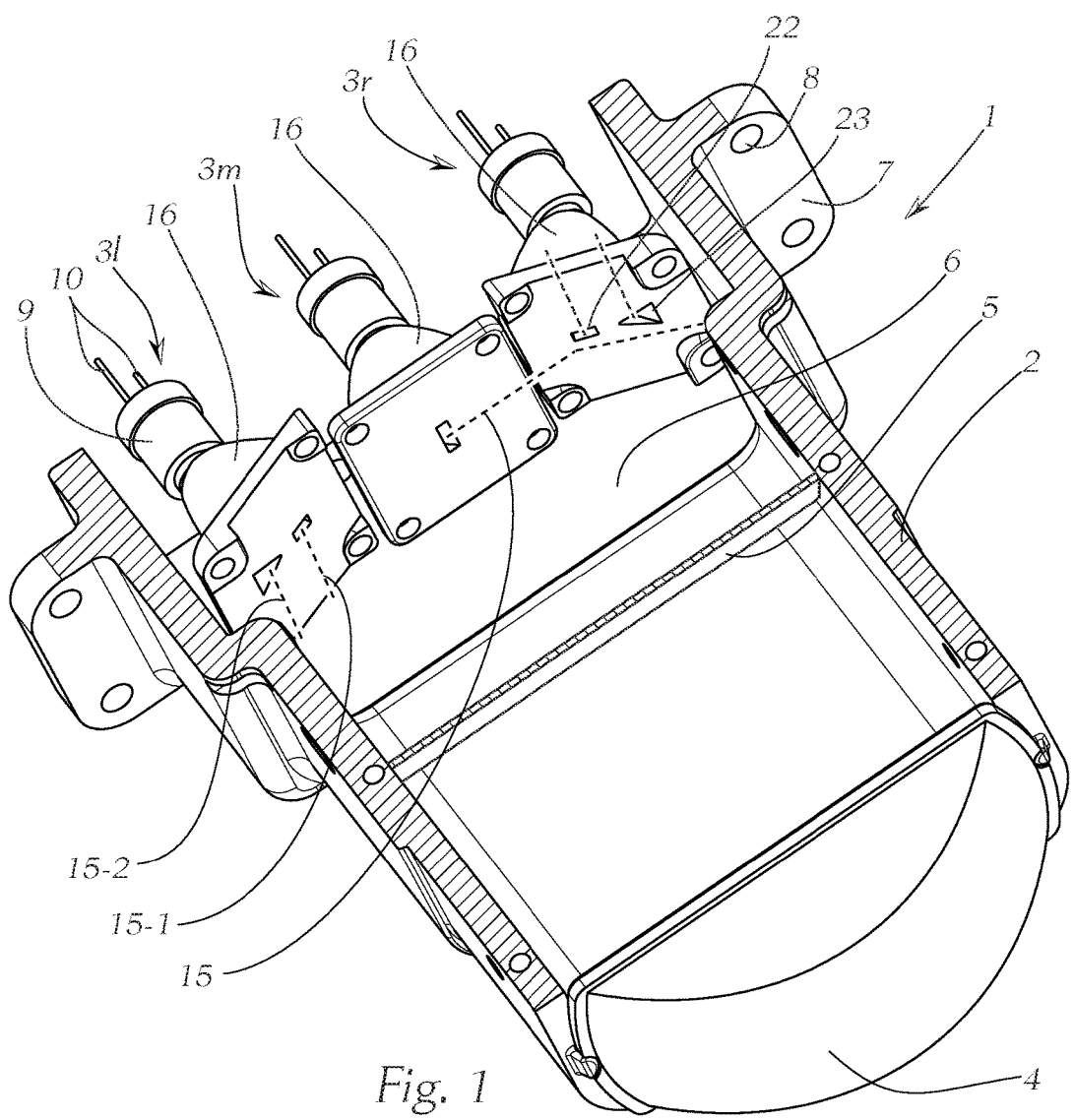

laser beam (15; 15-1, 15-2) which occurs when the phosphorus element (13) is defective or missing and which deflects this laser beam occurring in the event of disruption and keeps it away from the projection optical system and therefore from the carriageway space.

9 Claims, 3 Drawing Sheets

(51) Int. Cl.
     *F21S 41/29*     (2018.01)
     *G02B 27/09*     (2006.01)
     *G02B 27/12*     (2006.01)
     *G02B 27/30*     (2006.01)
     *F21S 45/70*     (2018.01)
     *F21Y 115/30*    (2016.01)

(52) U.S. Cl.
     CPC ....... *G02B 27/0972* (2013.01); *G02B 27/126* (2013.01); *G02B 27/30* (2013.01); *F21Y 2115/30* (2016.08)

(56) References Cited

FOREIGN PATENT DOCUMENTS

| | | |
|---|---|---|
| DE | 102013200521 A1 | 7/2014 |
| DE | 202015001682 U1 | 3/2015 |
| EP | 3037716 A1 | 6/2016 |

OTHER PUBLICATIONS

International Search Report for PCT/AT2016/060131, dated Mar. 6, 2017 (2 pages).

HEADLAMP FOR VEHICLES HAVING AT LEAST ONE LASER LIGHT MODULE

The invention relates to a headlight for vehicles, having at least one laser light module that includes a laser light source, and a phosphorus element situated downstream therefrom in the beam path, and an optical attachment.

In these types of headlights, the blue light, for example, of a laser beam is converted into essentially "white" light on a light conversion means, referred to here as a "phosphorus element," by fluorescence. The light conversion means usually has the shape of a small plate, and the process may take place according to the incident light principle or the transmitted light principle. In the first case (incident light), the converted light is emitted on the same side that the laser beam strikes, and in the second case (transmitted light), which is of more interest here, the converted light is emitted on the side that is opposite from the side irradiated by the laser. In both cases, the utilized light may also consist of a mixture of the blue laser light, for example, and the converted light in order to obtain a preferably "white" light.

An illumination device for motor vehicles of this type is provided in the document DE 20 2015 001 682 U1, in which infrared signal generators and signal receivers (not illustrated) are provided on different sides of a light conversion element, i.e., a phosphorus element, wherein the corresponding measuring radiation when there is damage to the phosphorus element may be determined, and the laser diode may be switched off.

The object of the invention is to provide a headlight for which, in the event of a malfunction in the sense of partial or complete damage to the phosphorus element, measures may be taken with little complexity which prevent or minimize the hazard resulting from the laser radiation.

This object is achieved with a headlight of the type stated at the outset, in which according to the invention the at least one laser light module is situated in a housing of the headlight, which has projection optics for projecting the light distribution, generated in the focal plane of the projection optics of the at least one laser light module, into the roadway space, and at least one deflection prism is integrated into the at least one optical attachment; the deflection prism is situated in the area of the laser radiation that passes through when the phosphorus element is defective or missing, and deflects this laser radiation that occurs in the event of a malfunction and keeps it away from the projection optics and thus, away from the roadway space.

The safety of the headlight in the event of damage to the phosphorus element may thus be effectively ensured with little effort.

In one advantageous refinement of the invention, it is provided that the optical axis of the optical attachment differs from the direction of the generated laser beam, and when the phosphorus element is defective or missing, the laser radiation is split into two partial beams, a deflection prism being associated with each partial beam. The desired safety is thus ensured even when two interfering laser beams arise, which is intentionally taken into account.

If the light entry surface of the deflection prism is adapted to the cross section of the laser beam that arises in the event of a malfunction, the circumstance is also taken into account that the laser beam generally does not have a circular cross section.

To avoid an unnecessarily large design of a deflection prism, it is advantageous when the at least one deflection prism is oriented with respect to a laser beam, which arises in the event of a malfunction, in such a way that the deflection of the laser beam takes place in parallel to the shorter axis of the beam cross section.

It is also advisable when a photodetector is situated in the housing of the headlight in the incidence area of the at least one laser beam that is deflected in the event of a malfunction, the photodetector being connected to a detection device that is configured for emitting a warning signal and/or switching off the at least one laser light source in the event of a malfunction.

On the other hand, it may advantageously be provided that a radiation-absorbing means is provided in the housing of the headlight in the incidence area of the at least one laser beam that is deflected in the event of a malfunction.

In one embodiment that is advantageous with regard to the light output and light distribution, at least two laser light modules are provided, wherein the position of the optical axis of the optical attachment in relation to the direction of the generated laser beam is different for the light modules.

Likewise in the sense of an optimal light distribution, it may advantageously be provided that at least two laser light modules are provided, whose laser light sources generate a laser beam having an elliptical beam cross section, wherein the axial position of the elliptical beam cross section in relation to the optical main axis of the headlight is different for the light modules.

It is advantageously also provided that the optical attachment of the at least one laser light module is designed as a TIR optics system.

In this regard, one simple and advantageous embodiment is characterized in that the at least one deflection prism is formed by a recess on the front side of the TIR optics.

It may be advantageous when the TIR optics have a collimating design for laser radiation that occurs in the event of a malfunction, and a collimated interfering beam is directed away from the projection optics.

Figure 3:
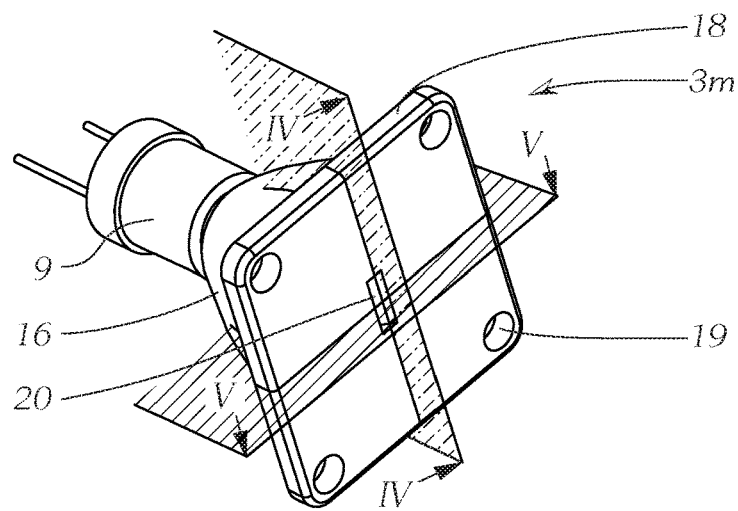
Figure 4:
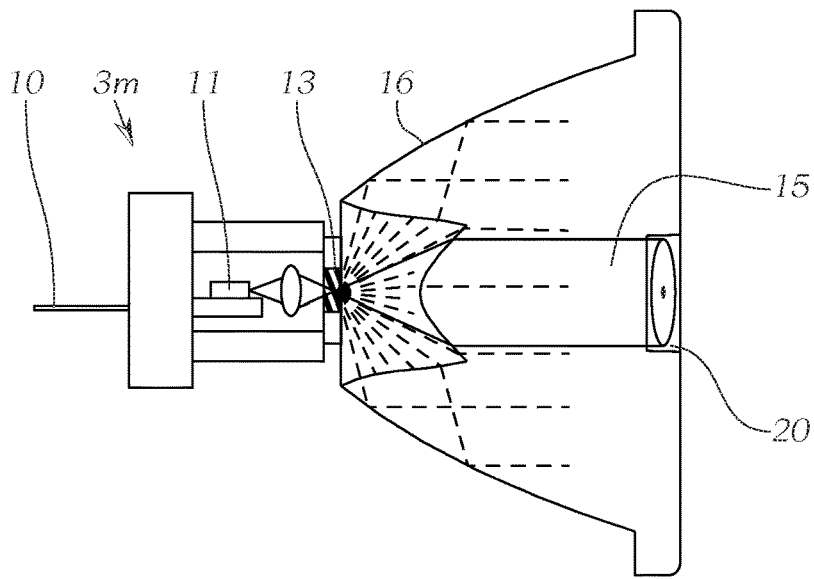
Figure 5:
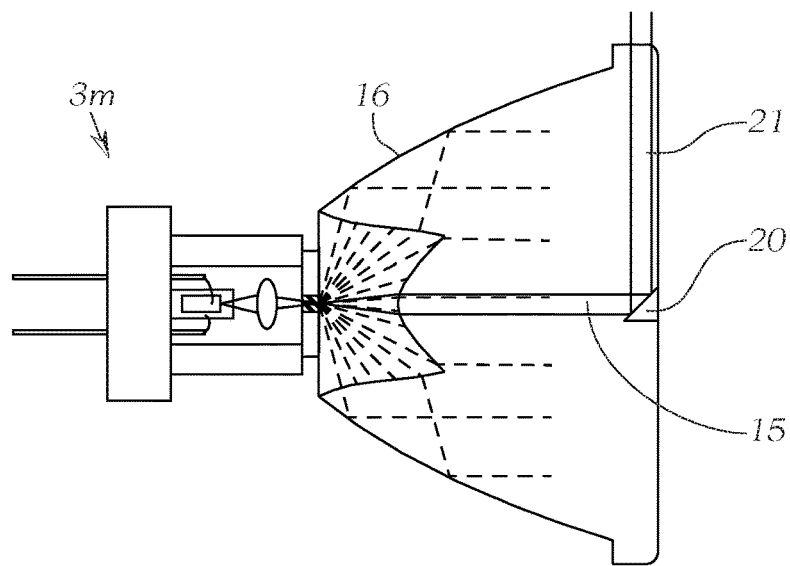
Figure 6:
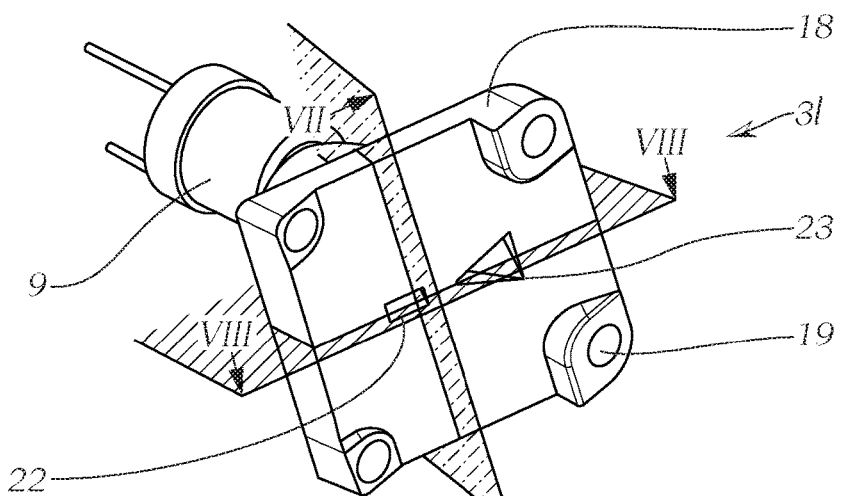
Figure 7:
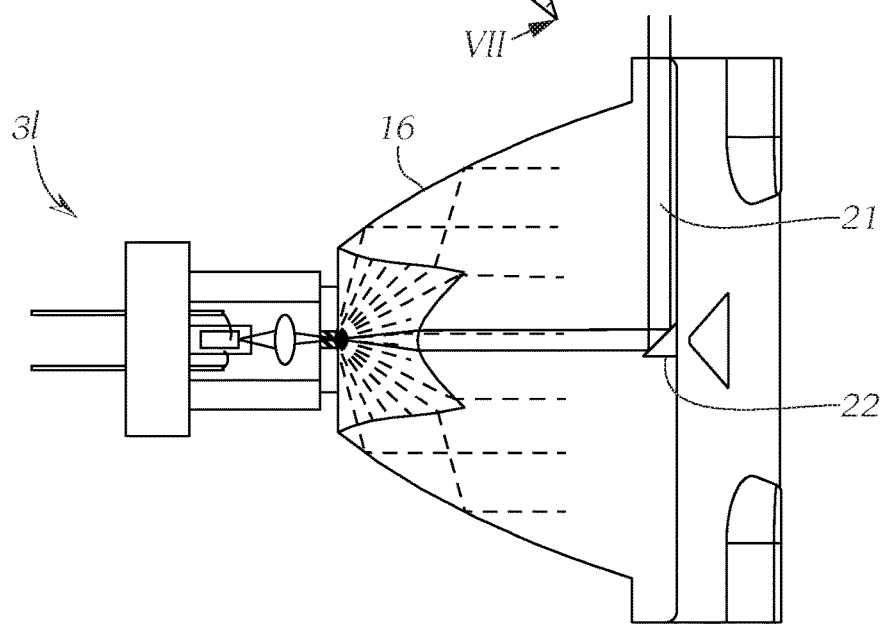
Figure 8:
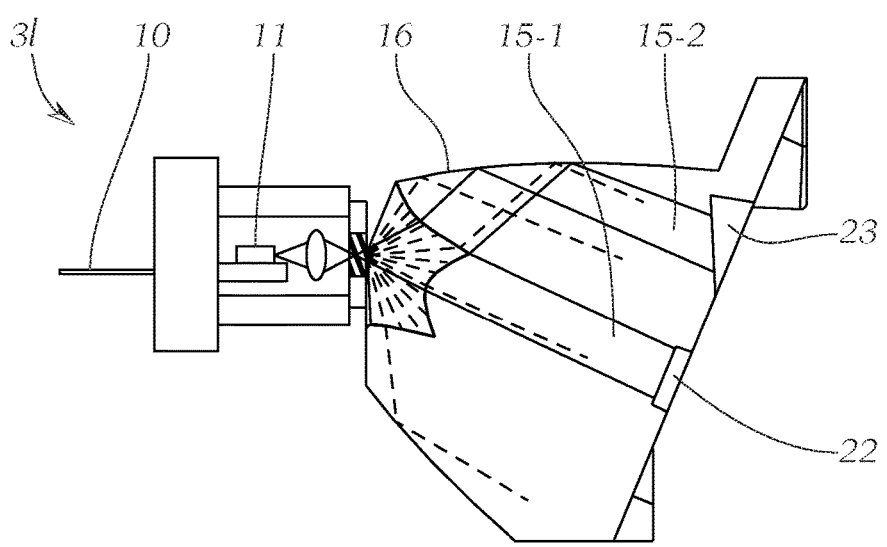

The invention is explained below based on exemplary embodiments with reference to the drawings, which show the following:

FIG. 1 shows a graphical, partially sectional schematic illustration of a headlight having three laser light modules, with omission of parts that are not essential to the invention, FIG. 2 shows a highly schematic illustration of a laser light source used in a laser light module, together with a phosphorus element, FIG. 3 shows the middle laser light module from FIG. 1 in a graphical illustration, FIG. 4 shows a section according to plane IV-IV in FIG. 3, FIG. 5 shows a section according to line V-V in FIG. 3, FIG. 6 shows the right laser light module from FIG. 1 in a graphical illustration, FIG. 7 shows a section according to plane VII-VII in FIG. 6, and FIG. 8 shows a section according to line VIII-VIII in FIG. 6.

One exemplary embodiment of the invention is explained in greater detail with reference to FIG. 1. In particular, the parts that are important for a headlight according to the invention are illustrated, it being clear that an automotive headlight also contains many other parts that allow meaningful use of the headlight in a motor vehicle, in particular a passenger vehicle or motorcycle.

In the exemplary embodiment, the shown headlight 1 according to the invention may be used to generate a high-beam light distribution. The headlight 1 has a headlight housing 2, in the rear area of which three laser light modules 3*l*, 3*m*, 3*r*, described in greater detail below, are situated. At its front side the housing 2 is closed off by projection optics 4. In the present exemplary embodiment, a diaphragm 5 that generates a light/dark cutoff during operation is situated between the light modules 3l, 3m, 3r and the projection optics 4. In addition, a radiation-absorbing means shaped as a flat panel 6 is situated in the rear area of the housing 2. Flanges 7 with boreholes 8 used for fastening the headlight 1 to body parts of a vehicle are apparent in the drawing. At this point it is noted that the "headlight" illustrated and described here may also be used as a headlight module or as a lighting unit that rests in a headlight having multiple modules. The term "headlight" is thus to be understood in this broader sense.

Before discussion of further features of the headlight 1 that are important to the invention, the basic design of a laser light source having a phosphorus element and its associated problems are described with reference to FIG. 2.

A laser light source 11 that is preferably designed as a laser diode is situated in a housing 9 from which electrical connections 10 are led out. However, this is not intended to exclude other designs, such as solid-state lasers. Inner focusing optics 12 that focus the laser beam on a phosphorus element 13 located at the front end of the housing are situated downstream from the laser light source 11. This phosphorus element 13 may be designed as a small plate or may be pill-shaped, and is used to convert at least a portion of the laser radiation into light of a different wavelength, for example to convert blue or also ultraviolet laser light into white-yellow visible light, for example.

When a "blue" laser is used, InGaN-based semiconductor lasers, for example, with wavelengths of 405 and 450 nm, for example 365 to 375 nm in the UV range, are suitable. The laser beam strikes the phosphorus element 13 and penetrates the light conversion material, referred to as "phosphorus" for short, contained in or on the phosphorus element. The phosphorus converts blue or UV light, for example, into "white" light. In the context of the present invention, "phosphorus" is generally understood to mean a material or a material mixture that converts light of one wavelength into light of another wavelength or of a wavelength mixture, in particular into "white" light, which is subsumable under the term "wavelength conversion." Luminescent dyes are used, wherein the output wavelength is generally shorter and thus higher in energy than the emitted wavelength mixture. The desired impression of white light is created by additive color mixing. "White light" is understood to mean light of a particular spectral composition which in humans gives the impression of the color white. Of course, the term "light" is not limited to radiation that is visible to the human eye. For the light conversion means, optoceramics, for example, which are transparent ceramics such as YAG:Ce (an yttrium-aluminum garnet doped with cerium), are suitable. Alternatively, semiconductor materials with embedded quantum dots may be used.

Mixed light 14 that is composed of converted light and scattered laser radiation and irradiated over a large spatial angle is generally present downstream from the phosphorus element 13. It is of importance that a laser beam 15 that is appropriately strongly focused arises when the phosphorus element 13 is missing or defective.

With reference to FIGS. 3, 4, and 5, apparent in a larger and more detailed illustration is the middle laser light module 3m, which contains the above-described laser light source 11 having the phosphorus element 13, as well as an optical attachment 16 that is situated in front of same and fixedly connected to the housing 9 of the laser light source 11. In the present exemplary embodiment, this optical attachment is a TIR optics system, and thus, optics with total reflection, made of transparent plastic, glass, or silicone, for example. Such total internal reflection (TIR) optics are known, and are used primarily for focusing the light of high-output LEDs. The optical attachment 16 collects the mixed light 14 exiting the phosphorus element (FIG. 2) and emits it toward the front, in essentially parallel light radiation 17. Boreholes 19 which are formed on a circumferential flange 18 and which are used for fastening the laser light module 3m in the headlight 1 via bolts or screws, not illustrated, are apparent in FIGS. 1 and 3.

The projection optics 4 are now used for projecting the light distribution, generated by the laser light modules 3l, 3m, 3r in the focal plane of the projection optics, into the roadway space.

Returning to the laser beam 15 (shown in FIG. 2) that arises in the event of a missing or defective phosphorus element 13, it is clear that such a relatively high-energy laser beam may represent a potential hazard to life forms, in particular to the eyesight of humans, since such a laser beam would exit the headlight 1 through the projection optics 4 and cause harm. To avoid this, it is provided that in the present case, a deflection prism 20 is integrated into the optical attachment 16 and is situated in the area of the laser beam 15 that passes through in the event of a defective or missing phosphorus element 13, and in the event of a malfunction deflects laser radiation that occurs and thus keeps it away from the projection optics 4, and thus from the roadway space ahead. The TIR optics 16 may also be provided with a collimating design for the laser radiation that occurs in the event of a malfunction, so that a collimated interfering beam is directed away from the projection optics 4, and diffuse laser radiation with less, or very little, uncontrollability occurs.

In the example shown, the deflection prism 20 is formed by a recess at the front side of the TIR projection optics. The deflection prism could also be molded onto the optical attachment. It is important only that a transition (in the present case, approximately 45°) from the material of the TIR optical attachment 16 to the air is created in order to achieve total reflection. The light entry surface of the deflection prism 20 is adapted to the cross section of the laser beam 15, and the deflection prism 20 is oriented with respect to the laser beam 15, which arises in the event of a malfunction, in such a way that the laser beam is deflected in parallel to the shorter axis of the beam cross section. This results in smaller dimensions of the deflection prism, which is also clearly apparent from FIGS. 4 and 5. FIG. 4 clearly shows the elliptical cross section of the laser beam 15 that arises in the event of a malfunction, it being noted that an elliptical beam cross section is the usual case for laser diodes. The laser beam that is deflected by deflection prisms is denoted by reference numeral 21 in the figures. This laser beam 21 may advantageously be directed to a radiation-absorbing means which absorbs and eliminates the hazardous laser radiation. Such a radiation-absorbing means 6 is shown in FIG. 1 and is discussed in greater detail below. As an alternative or addition to the radiation-absorbing means, one or more photosensors, not shown in the drawing, may be provided which detect at least a portion of the laser radiation that occurs in the event of a malfunction, and are connected to a detection device that is configured for emitting a warning signal and/or switching off a laser light source in the event of a malfunction.

Returning to FIG. 1 and also with reference to FIGS. 6, 7, and 8, it is apparent that for the right laser light module 3r as well as for the left laser light module 3l, the optical axis of the optical attachment 16 is offset relative to the optical axis of the laser light source 11 or with respect to the direction of the generated laser beam, by an angle of approximately 30°. With regard to the required fastening, the flange sections with the boreholes 19 have different designs for the two outer, i.e., left and right, laser light modules 3*l* and 3*r* than for the middle laser light module 3*m*; however, the optical attachments 16 of the laser light modules 3*l*, 3*r* as well as their left and right laser light sources 11 may have an identical design, thus saving on tooling costs.

In a comparison of FIGS. 4 and 5 to FIGS. 7 and 8, it is also apparent that the optical axes of the laser light sources of the middle laser light module 3*m* are rotated by 90° with respect to the right laser light module 3*r* and the left laser light module 3*l*. In the present case, the middle laser light module 3*m* has a "vertical" (elliptical) beam cross section, whereas the two outer laser light modules 3*l* and 3*m* [sic; 3*r*] have a "horizontal" (elliptical) beam cross section.

Due to the use of three laser light modules, understandably three times the light output is obtained compared to only a single laser light module, and the above-described offset of the axes by an angle (30° in the present case) as well as the rotation of the beam cross sections (by 90° in the present case) result in a high-beam light distribution that is adapted to actual practice. Of course, according to the invention it is also possible to provide the headlight with one or two, or more than three, laser light modules, or to select different offset angles and axial rotations.

It is apparent in FIG. 1 and in FIGS. 6 through 8 that the optical attachments for the outer laser light modules 3*l*, 3*r* each have two deflection prisms 22 and 23, and which also have different designs. This is due to the fact that in this case, the optical axes of the laser light sources are offset with respect to the optical axes of the optical attachments, and in the event of a malfunction, this results in the interfering laser beam being split into two partial beams 15-1 and 15-2, both of which must be rendered harmless or detected.

LIST OF REFERENCE NUMERALS 1 headlight
2 headlight housing
3*l* laser light module, left
3*m* laser light module, middle
3*r* laser light module, right
4 projection optics
5 diaphragm
6 radiation-absorbing means
7 flanges
8 boreholes
9 housing
10 connections
11 laser light source
12 focusing optics
13 phosphorus element
14 mixed light
15 laser beam
15-1 laser beam
15-2 laser beam
16 optical attachment
17 light radiation
18 flange
19 boreholes
20 deflection prism
21 laser beam
22 deflection prism
23 deflection prism

The invention claimed is:

1. A headlight (1) for vehicles comprising:
at least one laser light module (3*l*, 3*m*, 3*r*) that includes a laser light source (11), and a phosphorus element (13) situated downstream therefrom in the beam path;
at least one optical attachment (16); and
at least one deflection prism (20, 22, 23) integrated into the at least one optical attachment (16),
wherein the at least one laser light module (3*l*, 3*m*, 3*r*) is situated in a housing (2) of the headlight (1), which has projection optics (4) configured for projecting the light distribution, generated in the focal plane of the projection optics of the at least one laser light module, into a roadway space, and
wherein the at least one deflection prism (20; 22, 23) is configured to be situated in the area of laser radiation (15; 15-1, 15-2) that passes through when the phosphorus element (13) is defective or missing, and to deflect this laser radiation that occurs in the event of a malfunction and keep it away from the projection optics (4) and thus, away from the roadway space, and
wherein the optical attachment (16) is configured as a total internal reflection (TIR) optics system, and the at least one deflection prism (20; 22, 23) is formed by a recess on a front side of the optical attachment (16).

2. The headlight (1) according to claim 1, wherein the optical axis of the optical attachment (16) differs from the direction of the generated laser beam, and when the phosphorus element (13) is defective or missing, the laser radiation is split into two partial beams (15-1, 15-2), a deflection prism (22, 23) being associated with each partial beam.

3. The headlight (1) according to claim 1, wherein the light entry surface of the deflection prism (20; 22, 23) is adapted to the cross section of the laser beam (15; 15-1, 15-2) that arises in the event of a malfunction.

4. The headlight (1) according to claim 3, wherein the at least one deflection prism (20; 22, 23) is oriented with respect to a laser beam (15; 15-1, 15-2), which arises in the event of a malfunction, in such a way that the deflection of the laser beam takes place in parallel to the shorter axis of the beam cross section.

5. The headlight (1) according to claim 1, wherein a photosensor is situated in the housing (2) of the headlight (1) in the incidence area of the at least one laser beam (15; 15-1, 15-2) that is deflected in the event of a malfunction, the photosensor being connected to a detection device that is configured for emitting a warning signal and/or switching off the at least one laser light source (11) in the event of a malfunction.

6. The headlight (1) according to claim 1, wherein a radiation-absorbing means (6) is provided in the housing (2) of the headlight (1) in the incidence area of the at least one laser beam (15; 15-1, 15-2) that is deflected in the event of a malfunction.

7. The headlight (1) according to claim 1, comprising at least two of the laser light modules (3*l*, 3*m*, 3*r*), wherein the position of the optical axis of the optical attachment (16) in relation to the direction of the generated laser beam is different for the at least two laser light modules.

8. The headlight (1) according to claim 1, comprising at least two of the laser light modules (3*l*, 3*m*, 3*r*), the laser light sources (11) of which are configured to generate a laser beam having an elliptical beam cross section, wherein the axial position of the elliptical beam cross section in relation to the optical main axis of the headlight is different for the at least two laser light modules.

9. The headlight (1) according to claim 1, wherein the TIR optics (16) have a collimating design for laser radiation that occurs in the event of a malfunction, and a collimated interfering beam is directed away from the projection optics (4).

* * * * *